(12) United States Patent
McDevitt et al.

(10) Patent No.: US 12,493,038 B2
(45) Date of Patent: Dec. 9, 2025

(54) SYSTEMS AND METHODS OF ORAL CANCER ASSESSMENT USING CELLULAR PHENOTYPE DATA

(71) Applicant: NEW YORK UNIVERSITY, New York, NY (US)

(72) Inventors: John T. McDevitt, New York, NY (US); Michael P. McRae, Houston, TX (US)

(73) Assignee: New York University, New York, NY (US)

( * ) Notice: Subject to any disclaimer, the term of this patent is extended or adjusted under 35 U.S.C. 154(b) by 1250 days.

(21) Appl. No.: 16/432,324

(22) Filed: Jun. 5, 2019

(65) Prior Publication Data

US 2019/0369099 A1    Dec. 5, 2019

Related U.S. Application Data

(60) Provisional application No. 62/680,691, filed on Jun. 5, 2018.

(51) Int. Cl.
*G01N 33/574* (2006.01)
*B01L 3/00* (2006.01)
*G16H 50/30* (2018.01)

(52) U.S. Cl.
CPC .. *G01N 33/57407* (2013.01); *B01L 3/502761* (2013.01); *G16H 50/30* (2018.01); *B01L 2200/0668* (2013.01)

(58) Field of Classification Search
None
See application file for complete search history.

(56) References Cited

U.S. PATENT DOCUMENTS

| | | |
|---|---|---|
| 7,781,226 B2 | 8/2010 | McDevitt |
| 8,101,431 B2 | 1/2012 | Mcdevitt |
| 8,105,849 B2 | 1/2012 | Mcdevitt |
| 8,257,967 B2 | 9/2012 | Mcdevitt |
| 8,377,398 B2 | 2/2013 | Mcdevitt |
| 2006/0073585 A1 | 4/2006 | McDevitt |
| 2006/0079000 A1 | 4/2006 | Floriano |
| 2006/0234209 A1 | 10/2006 | Walker |
| 2006/0257854 A1 | 11/2006 | McDevitt |
| 2006/0257941 A1 | 11/2006 | McDevitt |
| 2006/0257991 A1 | 11/2006 | McDevitt |
| 2008/0038738 A1 | 2/2008 | Weigum |

(Continued)

FOREIGN PATENT DOCUMENTS

| | | |
|---|---|---|
| WO | 03090605 | 11/2003 |
| WO | 2004009840 | 1/2004 |

(Continued)

OTHER PUBLICATIONS

Krishna et al., Demographic Risk Factors, Affected Anatomical Sites and Clinicopathological Profile for Oral Squamous Cell Carcinoma in a North Indian Population, Asian Pac J Cancer Prev, 15 (16), pp. 6755-6760, Dec. 2014. (Year: 2014).*

(Continued)

*Primary Examiner* — Rebecca M Giere
(74) *Attorney, Agent, or Firm* — Riverside Law LLP

(57) ABSTRACT

The present disclosure is related to systems and methods to be used as aids in the diagnosis of risk for oral cancer by identifying cellular phenotype characteristics of a noninvasive brush biopsy sample.

10 Claims, 13 Drawing Sheets

(56) References Cited

U.S. PATENT DOCUMENTS

| | | |
|---|---|---|
| 2008/0050830 A1 | 2/2008 | Floriano |
| 2008/0176253 A1 | 7/2008 | Christodoulides |
| 2008/0300798 A1 | 12/2008 | McDevitt |
| 2010/0291431 A1 | 11/2010 | Shih |
| 2012/0208715 A1 | 8/2012 | Mcdevitt |
| 2012/0322682 A1 | 12/2012 | Mcdevitt |
| 2013/0130933 A1 | 5/2013 | Mcdevitt |
| 2013/0274136 A1* | 10/2013 | Mcdevitt |
| 2013/0295580 A1* | 11/2013 | McDevitt ......... G01N 33/57407 435/6.14 |
| 2014/0094391 A1 | 4/2014 | Mcdevitt |
| 2014/0235487 A1 | 8/2014 | Mcdevitt |
| 2015/0111778 A1 | 4/2015 | Mcdevitt |
| 2019/0369099 A1 | 12/2019 | Mcdevitt |

FOREIGN PATENT DOCUMENTS

| | | |
|---|---|---|
| WO | 2004072097 | 8/2004 |
| WO | 2005083423 | 9/2005 |
| WO | 2005085796 | 9/2005 |
| WO | 2005085854 | 9/2005 |
| WO | 2005085855 | 9/2005 |
| WO | 2005090983 | 11/2005 |
| WO | 2007053186 | 7/2007 |
| WO | 2007134191 | 11/2007 |
| WO | 2007134189 | 7/2008 |
| WO | 2008131039 | 1/2009 |
| WO | 2007002480 | 3/2009 |
| WO | 2011022628 | 2/2011 |
| WO | 2012021714 | 4/2012 |
| WO | 2012065025 | 7/2012 |
| WO | 2012154306 | 11/2012 |
| WO | 2012065117 | 4/2014 |

OTHER PUBLICATIONS

Krishna, Akhilesh, et al. "Demographic risk factors, affected anatomical sites and clinicopathological profile for oral squamous cell carcinoma in a north Indian population." Asian Pacific Journal of Cancer Prevention 15.16 (2014):6755-6760.

* cited by examiner

Showing: Benign Lesion Sample

Showing: OSCC Lesion Sample

SYSTEMS AND METHODS OF ORAL CANCER ASSESSMENT USING CELLULAR PHENOTYPE DATA

CROSS-REFERENCE TO RELATED APPLICATIONS

This application claims priority to US provisional patent application No. 62/680,691, filed on Jun. 5, 2018, incorporated herein by reference in its entirety.

STATEMENT REGARDING FEDERALLY SPONSORED RESEARCH OR DEVELOPMENT

This invention was made with government support under 5R44DE025798-03 awarded by the National Institutes of Health. The government has certain rights in the invention.

BACKGROUND OF THE INVENTION

All squamous cell carcinoma lesions are thought to begin via the repeated, uncontrolled division of cancer stem cells of epithelial lineage or characteristics. Accumulation of these cancer cells causes a microscopic focus of abnormal cells that are, at least initially, locally confined within the specific tissue in which the progenitor cell resided. This condition is called squamous cell carcinoma in situ, and it is diagnosed when the tumor has not yet penetrated the basement membrane or other delimiting structure to invade adjacent tissues. Once the lesion has grown and progressed to the point where it has breached, penetrated, and infiltrated adjacent structures, it is referred to as "invasive" squamous cell carcinoma. Once a carcinoma becomes invasive, it is able to spread to other organs and cause a metastasis or secondary tumor to form.

Oral cancer is a subtype of head and neck cancer and is any cancerous tissue growth located in the oral cavity. It may arise as a primary lesion originating in any of the oral tissues, by metastasis from a distant site of origin, or by extension from a neighboring anatomic structure, such as the nasal cavity. Oral cancers may originate in any of the tissues of the mouth, and may be of varied histologic types: teratoma, adenocarcinoma derived from a major or minor salivary gland, lymphoma from tonsillar or other lymphoid tissue, or melanoma from the pigment-producing cells of the oral mucosa. There are several types of oral cancers, but around 90% of diagnoses cases are squamous cell carcinomas, originating in the tissues that line the mouth and lips.

Oral squamous cell carcinoma (OSCC) is a global health problem afflicting close to 300,000 people each year. Despite significant advances in surgical procedures and treatment, the long-term prognosis for patients with OSCC remains poor, with a 5-year survival rate which is among the lowest for all major cancers. Most oral and pharyngeal cancers (OPC) are diagnosed at Stage III or IV when the 5-year survival rate is just 45% and 32%, respectively. However, the survival rate increases dramatically to 84% when this abnormality is detected in its early stage. Unfortunately, only 29% of OPC cases are detected at an early stage.

High mortality associated with OSCC is often attributed to advanced disease stage at diagnosis, underscoring the need for new diagnostic methods targeting early tumor progression and malignant transformations.

Thus, there is a need in the art for improved methods and systems for detection of oral cancer and OSCC. The present invention satisfies this unmet need.

SUMMARY OF THE INVENTION

In one aspect, a method of assessing oral cancer in a subject comprises identifying the cellular phenotype of one or more cells in a sample of the subject, determining one or more cellular phenotype characteristics of the sample based upon the identified cellular phenotype of the cells, and using the cellular phenotype characteristics to assess the presence or severity of oral cancer in the subject. In one embodiment, the one or more cellular phenotype characteristics comprises one or more selected from the group consisting of: percent of normal squamous cells, percent of non-normal squamous cells, percent of small round cells, percent of white blood cells, and percent of lone nuclei.

In one embodiment, the method further comprises determining one or more morphological characteristics from individual cells of the sample, said morphological characteristics selected from nuclear area, cell area, cell circularity, cell aspect ratio, and cell roundness, transmitting the one or more morphological characteristics to a computer, and using the cellular phenotype characteristics and morphological characteristics to assess the severity of oral cancer in the subject. In one embodiment, the method further comprises determining one or more biomarker levels in cells of the sample, said biomarker selected from the group consisting of alpha V beta 6 (AVB6), Epidermal Growth Factor Receptor (EGFR), Ki67, Geminin, Mini Chromosome Maintenance protein (MCM2), beta catenin, EMPPRIN, and CD147, transmitting the one or more biomarker levels to a computer, and using the cellular phenotype characteristics and biomarker levels to assess the severity of oral cancer in the subject.

In one embodiment, the method of further comprises transmitting one or more demographic data of the subject to a computer, said demographic data selected from the group consisting of gender, age, alcohol intake, and smoking status of the subject, and using the cellular phenotype characteristics and biomarker levels to assess the severity of oral cancer in the subject. In one embodiment, the method allows for the distinguishing between at least: 1) normal, 2) benign lesions, 3) mild dysplasia, 4) moderate dysplasia, 5) severe dysplasia, 6) carcinoma in situ; and 7) malignant lesion. In one embodiment, the method comprises calculating a risk score based upon the cellular phenotype characteristics. In one embodiment, the method comprises displaying the risk score on an output device. In one embodiment, said calculation is based on artificial neural nets, logistic regression, linear discriminate analysis, or random forests. In one embodiment, the method further comprises transmitting the one or more cellular phenotype characteristics to a remote processor to be assessed by a pathologist.

In another aspect, a software stored on a non-transitory computer-readable medium identifies the cellular phenotype of one or more cells in a sample of a subject, determines one or more cellular phenotype characteristics of the sample based upon the identified cellular phenotype of the cells, and uses the cellular phenotype characteristics to assess the presence or severity of oral cancer in the subject. In one embodiment, the software calculates a risk score based upon the cellular phenotype characteristics.

In another aspect, a system comprises a cartridge and a separate reader, the cartridge comprising a generally flat substrate having embedded microfluidic channels connecting an inlet port to an embedded downstream assay chamber, wherein the assay chamber comprises a membrane for collection of cells administered to cartridge via the inlet port, the reader comprising a non-transitory computer-readable medium having software stored thereon, which when executed by a processor performs steps comprising identifying the cellular phenotype of one or more cells in a sample of a subject, determining one or more cellular phenotype characteristics of the sample based upon the identified cellular phenotype of the cells, and using the cellular phenotype characteristics to assess the presence or severity of oral cancer in the subject. In one embodiment, the software calculates a risk score based upon the cellular phenotype characteristics. In one embodiment, the software transmits the risk score or cellular phenotype characteristics to a remote processor for assessment by a pathologist. In one embodiment, the cartridge comprises one or more reagents for detecting one or more of: nuclei, cytoplasm, alpha V beta 6 (AVB6), Epidermal Growth Factor Receptor (EGFR), Ki67, Geminin, Mini Chromosome Maintenance protein (MCM2), beta catenin, EMPPRIN, CD147, CD44, IGF-1, MMP-2, MMP-9, CD59, Catalase, Profilin, S100A9/MRP14, M2BP, CEA, and Carcinoma associated antigen CA-50.

BRIEF DESCRIPTION OF THE DRAWINGS

The following detailed description of embodiments of the invention will be better understood when read in conjunction with the appended drawings. It should be understood that the invention is not limited to the precise arrangements and instrumentalities of the embodiments shown in the drawings.

DETAILED DESCRIPTION

Definitions

Figure 1:
FIG. 1 depicts an exemplary disposable cartridge for analyzing an oral cell sample using the method and system of the present invention.

Unless defined otherwise, all technical and scientific terms used herein have the same meaning as commonly understood by one of ordinary skill in the art to which this invention belongs.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, or ±0.1% from the specified value, as such variations are appropriate to perform the disclosed methods.

The word "morphometric" as used herein means the measurement of such cellular shape or morphological characteristics as cell shape, size, nuclear to cytoplasm ratio, membrane to volume ratio, and the like.

The phrase "based on" includes both contemporaneous use as well as prior use to establish parameter weights. Thus, a calculation based on earlier data training using neural nets would still be "based on" such neural net analysis, even if this part of the computational analysis does not need to be repeated.

The phrase "each of said plurality of cells" is meant to refer to individually testing each of the cells in at least a portion of a sample that is inputted into a measuring device, but excluding cell loss due to lysis and any losses due to excess sample not being tested. By individual testing, what is meant is that data is collected that is unique to each cell, nevertheless many cell images can be captured in a single photograph.

Nuclear to cytoplasmic ratio is calculated based on cell area and nuclear area e.g., NA/CA-NA.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the disclosed methods.

Ranges: throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

The following abbreviations are used herein:

| Abbreviations | |
|---|---|
| Ab | Antibody |
| ABS | Acrylonitrile butadiene styrene |
| AUC | Area under the curve |
| AVB6 or αVβ6 | Alpha V beta 6, an integrin |
| Beta-catemn | β Catenin is a protein that in humans is encoded by the CTNNB1 gene |
| BM | Biomarker |
| DNA | Deoxyribonucleic acid |
| EGFR | Epidermal Growth Factor Receptor |
| EMMPRIN | Extracellular Matrix Metalloproteinase Inducer, aka CD147 |
| FITC | Fluorescein isothiocyanate |
| HNSCC | Head and neck squamous cell carcinomas |
| IVD | in vitro diagnostic device |
| Ki67 | Antigen KI-67 also known as Ki-67 or MKI67 is a protein that in humans is encoded by the MKI67 gene |
| LOD | Limits of detection |
| MAB | Monoclonal Ab |
| MCM2 | Mini Chromosome Maintenance protein 2 |
| N/C ratio | nuclear/cytoplasmic ratio |
| BNC | Bio-nano-chip |
| NPV or PV− | Negative predictive value |
| NRAT | Nuclear to Cytoplasm ratio |
| NSE | Neuron-specific enolase |
| NUAR | Nuclear Area |
| OSCC | oral squamous cell carcinoma |
| PBSA | Phosphate buffered saline with bovine serum albumin |
| PML | Potentially malignant lesions |
| PBNC | Programmable BNC |
| PPV or PV+ | positive predictive value |
| PV | Predictive value |
| RNA | Ribonucleic acid |
| ROC | Receiver operating characteristic. A graphical plot of the sensitivity, or true positive rate, vs. false positive rate (1-specificity or 1-true negative rate), for a binary classifier system as its discrimination threshold is varied. The ROC can also be represented equivalently by plotting the fraction of true positives out of the positives (TPR = true positive rate) vs. the fraction of false positives out of the negatives (FPR = false positive rate). Also known as a Relative Operating Characteristic curve, because it is a comparison of two operating characteristics (TPR & FPR) as the criterion changes. |
| ROI | Region of interest |
| SUSP | A filter that flags suspicious cell according to morphometric and molecular parameters |
| WBCi | A filter that flags infiltrated white blood cells according to morphometric and molecular parameters |
| WCAR | Whole cell area, i.e. cytoplasm area |
| WCIR | Whole cell circularity |
| Wnt | Proto-oncogene protein Wnt |

Description

The present disclosure relates to devices and methods for the automated identification and classification of cellular phenotypes among a cell population within a biological sample for the detection of the presence or progression of a cancer, for example oral cancer. For example, in certain embodiments, the invention relates to the automated detection of normal squamous cells, small round cells, leukocytes, and lone nuclei in a sample. In certain aspects, the invention serves as an aid in the diagnosis of oral cancer, assessment of oral cancer progression, classification of oral cancer severity, scoring oral cancer lesions, assessment of the effectiveness of oral cancer treatment, or the like.

In certain embodiments, the method integrates multiple parameters including, but not limited to, cellular phenotype, cell morphological data, biomarker data, lesion characteristics, and/or demographic information to guide health care professionals on the management of subjects having, or at risk for developing, malignant lesions. For example, in one embodiment, the method uses multiple binary classifications as inputs to create a numerical scale. The integration of the parameters described herein provides an improved ability to assess cancer risk and evaluate disease progression.

In one embodiment, the invention comprises a cartridge comprising at least one inlet, fluidic channels, and a plurality of reagents. The reagents may comprise cellular dyes, nuclear dyes, bioaffinity ligands, antibodies, and the like, used to assess cellular phenotype, cell morphology, and/or biomarker expression. Suitable bioaffinity ligands include any molecule that binds to a biomarker of interest. Exemplary bioaffinity ligands include, but are not limited to, antibodies, antibody fragments, proteins, peptides, peptidomimetics, nucleic acid molecules, bacteriophages, aptamers, and small molecules. A biological sample of a subject is obtained and applied to the cartridge for analysis. The sample may be any suitable cytological sample. For example, in certain embodiments, the sample is a suspension of cells collected with a brush, such as a rotating brush. The sample may be obtained from a lesion or suspected lesion in the oral cavity to assess the risk or presence of oral cancer. In certain embodiments, the sample is derived from a solid tissue sample or biopsy sample. In certain embodiments, the sample comprises a saliva sample or a cheek swabbed sample.

In certain embodiments, the sample is processed prior to analysis. For example, the sample may be processed to permeabilize and fix the cells contained therein. However, in certain embodiments, processing of the sample is not necessary. For example, in certain instances sample collection using a rotating brush is sufficient to permeabilize the cells.

In one embodiment, the sample is filtered, for example by collecting cells on a permeable membrane that allows debris to pass through, but not whole cells. In one embodiment, the sample is enriched for a specific cell population or subpopulation. For example, magnetic beads coupled, e.g., to a receptor or cell surface proteins, such as an antibody for EGFR, can be used to isolate and enrich specific populations.

The sample processing steps described herein (e.g., permeabilization, fixation, filtering, and enrichment) can occur prior to administration of the sample to the cartridge, or can occur directly within the cartridge. That is, in certain embodiments, the cartridge comprises reagents needed for such processing.

FIG. 1 shows an exemplary cartridge, which is disposable and fits into a standard reader.

In more detail, a sample entry port 101 is fluidly connected via microfluidics to the assay chamber 102. The assay chamber 102 comprises a permeable membrane to collect cells within the sample. The assay chamber is either open to the environment or comprises a transparent lid to allow for imaging and image analysis of the cells within the assay chamber 102. In certain embodiments, one or more pinch valves function to allow controlled delivery of microfluidic elements. In some embodiments, buffer entry ports are fluidly connected to microfluidics of the cartridge. In certain embodiments, the cartridge comprises one or more blister packs that contain liquid reagents, such as wash buffers. Blister packs allow for a self-contained cartridge with a smaller footprint. Alternatively, the device could be connected directly to an external fluid source via buffer entry ports. The blisters are accessed via pressure actuation, a function provided by the analyzer/reader and embedded software, and thus are preferably foil blisters.

In certain embodiments, the cartridge comprises a bubble trap which allows for pressure relief, otherwise the fluid would not flow in the microfluidic channels. Alternatively, waste chambers can be closed under negative pressure and thus pull fluid in their direction when a valve is opened. In one embodiment, the cartridge comprises a reagent port, which can contain an absorbent pad having dried reagents thereon. Thus the reagent port can comprise an access hatch or affixed cover and a recess, into which a reagent pad can be placed. Alternatively, the reagent port could be a blister pack or an inlet allowing connection to external fluids. In certain embodiments, the cartridge comprises a waste reservoir and a waste reservoir external vent fluidly connected via a microfluidic channel to the assay chamber having a transparent access hatch or affixed cover allowing visual access to the chamber. The cartridge may also comprise a port to a waste chamber, although the chamber can be made sufficiently large to hold all waste and this port omitted.

In certain embodiments, the cartridge is a disposable plastic chip made by injection molding and/or etching of parts and adhering layers together. Exemplary materials for constructing the cartridge are plastics of durometer 34-40 Shore D for the substrate and microfluidics, such as polymers and copolymers of styrene, acrylic, carbonate, butadiene, propylene, vinyl, acrylonitrile, and foil for the blisters.

In certain embodiments, the cartridge comprises one or more reagents for detection of biomarkers or for labeling cellular components (e.g., cytoplasm, membrane, and nucleus). The reagents may be within a blister pack or dried on a reagent pad.

In one embodiment, an inlet port is fluidly connected to the detection window, and a sample is applied and travels to the window where cells are trapped by the membrane. In one embodiment, the cartridge further comprises regent chambers, and the reader activates the reagent chamber, pushing wash fluid to the assay chamber to wash away cell debris as needed. Next, a second reagent chamber is activated, and travels past a dry pad or chamber containing dry bioaffinity ligands (e.g. antibodies) and stains, reconstitutes same and carries these to the assay chamber, where the cells are stained with nuclear, cytoplasmic and antibody stains. Optionally, these reagents can be premixed with the second chamber fluid. In one embodiment, the stability of antibody components is improved in the dry form. In one embodiment, the dry pads are exchangeable, e.g. via a hinged lid. The excess reagents can then be washed away, using wash from the first chamber, and the remaining signals detected and analyzed. Additional assay chambers can be provided, depending on the number of analytes to be analyzed and the spectral range of the signals (and device capacity to distinguish same). Alternatively, the cells can be serially stained, and then washed clean and restrained.

In one embodiment, the invention relates to a system comprising the cartridge and a reader. For example, in one embodiment, the reader comprises a housing containing a slot for receiving a cartridge, a processor having a user interface, an optical or energy sensing means, and a means for moving fluid. In one embodiment, the housing also contains heating and cooling means, such as a piezoelectric heater/cooler, radiant heater and fan, peltier, or the like. The optical sensing means is configured to receive a signal from cells within the assay chamber, and the microfluidics are configured so as to allow fluid movement to and from the assay chamber. The processor and user interface control the system and the processor records data from said optical sensing means. In one embodiment, the reader includes a display means operably connected to said processor for displaying said data, but the display means is optional, and a data-port can instead connect to independent processors and/or display means.

In certain embodiments, the system comprises a dedicated reader manufactured to be specific for this application, thus minimizing the size and complexity of the device, while maximizing ease of use.

Figure 2:
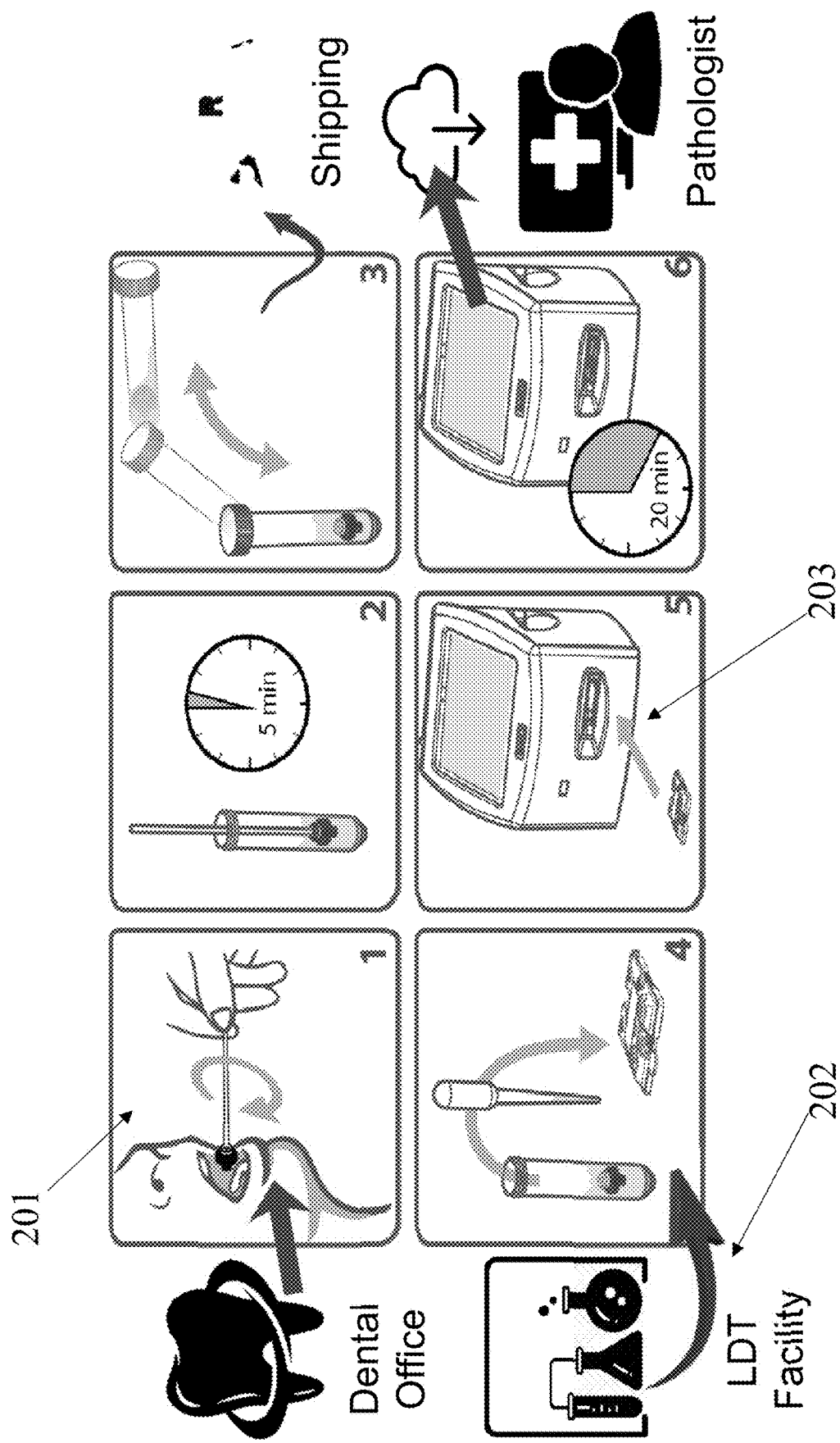
FIG. 2 depicts an exemplary workflow of the method of the invention, where samples are transported for analysis and where results are analyzed by a pathologist.

An exemplary method of the invention is depicted in FIG. 2, where a sample is obtained using a rotating brush during a dental visit in step 201. It will be understood however, that any oral sample obtained in any setting is encompassed by the present invention. In certain embodiments, the sample is transported to a dedicated facility 202 for analysis. In other embodiments, the sample is applied to a cartridge and reader 203 in a point-of-care system. The cartridge and reader are used for the identification of cellular phenotype parameters, as well as, in certain embodiments, for the detection of morphological and biomarker data. In certain embodiments, the obtained data is sent over a network or to the cloud for analysis by a health care professional.

The system detects a variety of cellular phenotype, morphological and biological markers in individual cells, including for example, DAPI for DNA, and phalloidin for F-actin. These two stains provide a great deal of information about cell morphology, for example, nuclear to cytoplasm ratio (an important indicator that a cell is transforming) and cell shape (cancer cells are rounder). Other parameters that can be measured and used in the model include but are not limited to:

Area (WCArea[red]): Area of whole cell (WC) selection in square pixels determined in red from a Phalloidin stain.

Mean Intensity Value (WCMean[red], [green]): Average value within the WC selection. This is the sum of the intensity values of all the pixels in the selection divided by the number of pixels. [red] has QA/QC value and [blue] has limited descriptive value, whereas [green] is the most important for surface markers. For intracellular markers, the NuMean[green] is most descriptive.

Standard Deviation (WCStdDev[red], [green]): Standard deviation of the intensity values used to generate the mean intensity value. [red] useful for Phalloidin, QA/QC and descriptive, [green] for surface markers.

Modal Value (WCMode[red], [green]): Most frequently occurring value within the selection. Corresponds to the highest peak in the histogram. Similar to Mean in terms of value.

Min & Max Level (WCMin and WCMax[red], [green], [blue]): Minimum and maximum intensity values within the selection. Limited descriptive value, may be used for QA/QC.

Integrated Density (WCIntDen[red], [green], [blue]): Calculates and displays "IntDen" (the product of Area and Mean Gray Value)—Dependent values.

Median (WCMedian[red], [green]): The median value of the pixels in the image or selection. This again is similar to Mean and Mode in terms of utility.

Circ. (circularity): $4\pi*area/perimeter^2$: A value of 1.0 indicates a perfect circle. As the value approaches 0.0, it indicates an increasingly elongated shape. Values may not be valid for very small particles.

AR (aspect ratio): diameters of major_axis/minor_axis.

Round (roundness): $4*area/(\pi*major\_axis^2)$: Could also use the inverse of the aspect ratio.

The present invention also includes the detection and identification of the cellular phenotype of cells within the sample. For example, the presence and relative amount of normal squamous cells, small round cells, leukocytes, and/or lone nuclei in a sample are determined to assess oral cancer status in a sample of interest. In certain embodiments, the various cellular phenotypes are identified using complex object recognition routines as defined by machine learning methods. For example, in one embodiment, a user (e.g., a cytology expert) initially selects the cell types of interest. Then, various unsupervised learning routines are exploited. In doing so, the learning cell-level visual representation can obtain a rich mix of features that are highly reusable for various tasks, such as cell-level classification, nuclei segmentation, and cell counting. The cell recognition procedures use various parameters, including, but not limited to, morphological parameters, protein expression, nucleation size, shape, and intensity parameters, to recognize and identify a cell as being of a particular cellular phenotype.

In certain embodiments, the percentage of cells of a particular cellular phenotype is used to diagnose oral cancer, assess the risk of developing oral cancer, and/or assess the progression of oral cancer.

For example, in one embodiment, a sample with about 0% to about 85% normal squamous cells indicates the presence or progression of oral cancer, while a sample with about 90%-100% of normal squamous cells indicates normal tissue.

In one embodiment, a sample with about 15% to about 100% of non-normal squamous cells indicates the presence or progression of oral cancer, while a sample with about 0%-10% of non-normal squamous cells indicates normal tissue.

In one embodiment, a sample with about 5% to about 100% small round cells indicates the presence or progression of oral cancer, while a sample with about 0% to about 5% of small round cells indicates normal tissue.

In one embodiment, a sample with about 5% to about 100% white blood cells indicates the presence or progression of oral cancer, while a sample with about 0% to about 5% of white blood cells indicates normal tissue.

In one embodiment, a sample with about 20% to about 100% lone nuclei indicates the presence or progression of oral cancer, while a sample with about 0% to about 20% of lone nuclei indicates normal tissue.

Cells can also be stained with labeled bioaffinity ligands (e.g. antibodies) for the various cancer markers discussed herein. Generally, different biomarkers should be labeled with different labels, so that they can be distinguished. However, some overlap is allowable where the markers are spatially distinguished in the cell, e.g., EGFR on the cell surface and Ki67 in the nucleus. Alternatively, the chip can be divided into two or three portions (or two chips used) and separate groups of labels employed.

As yet another alternative, the initial analysis can be on a whole cell basis, then the cells lysed and studied, and this may provide additional information about intracellular antigens. Of course, the data would then be an average over the cells in the sample, unless the cells are fixed in a particular location and the cell contents do not mix.

This disclosure also describes an expanded panel of biomarkers to cover early detection and progression of oral cancer. The samples can be analyzed for the expression of molecular biomarkers including AVB6, EGFR, Ki67, Geminin, CD147, MCM2, Beta Catenin, and EMPPRIN. Other exemplary biomarkers include, but are not limited to, IL-1β, CD44, IGF-1, MMP-2, MMP-9, CD59, Catalase, Profilin, S100A9/MRP14, M2BP, CEA, and Carcinoma associated antigen CA-50. The presence and/or abundance of biomarkers can be accomplished via detection of the biomarkers in whole cells or in a protein sample detected by way of an immunoassay, such as a bead-based cartridge described in U.S. Patent Application Publication No.: US20140094391, which is incorporated by reference in its entirety.

In certain embodiments, the system and method further utilize demographic data of the subject, including, but not limited to, gender, age, alcohol intake, and smoking status of the subject.

In one embodiment, the invention provides a method of diagnosing oral cancer, determining the risk of developing oral cancer, assessing progression of oral cancer, or scoring an oral cancer lesion. In one embodiment, the method comprises inputting the following data points into a computer: one or more cellular phenotype characteristics from a population of oral cells from a subject, the cellular phenotype characteristics selected from percentage of normal squamous cells, percentage of non-normal squamous cells, percentage of small round cells, percentage of white blood cells, and percentage of lone nuclei.

In one embodiment, the method further comprises inputting the following data points into a computer: one or more morphological characteristics from individual oral cells from a patient, said morphological characteristics selected from nuclear area, cell area, cell circularity, cell aspect ratio, and cell roundness. In one embodiment, the method further comprises inputting the following data points into a computer: one or more of gender, age, alcohol intake, and smoking status of said patient. In one embodiment, the method further comprises inputting the following data points into a computer: one or more biomarker levels from individual oral cells from said patient, said biomarker selected from the group consisting of alpha V beta 6 (AVB6), Epidermal Growth Factor Receptor (EGFR), Ki67, Geminin, Mini Chromosome Maintenance protein (MCM2), beta catenin, EMPPRIN, CD147, IL-1β, CD44, IGF-1, MMP-2, MMP-9, CD59, Catalase, Profilin, S100A9/MRP14, M2BP, CEA, and Carcinoma associated antigen CA-50.

In one embodiment, the method comprises calculating a risk score based on each of the above inputs, said risk score allowing a user to distinguish at least the following: i) benign lesions, ii) dysplastic lesions, and iii) cancerous lesions. In one embodiment, the method comprises displaying said risk score on an output device.

In one embodiment, the method comprises inputting the following data points into a computer: one or more cellular phenotype characteristics from a population of oral cells from a subject, the cellular phenotype characteristics selected from percentage of normal squamous cells, percentage of non-normal squamous cells, percentage of small round cells, percentage of white blood cells, and percentage of lone nuclei.

In one embodiment, the method further comprises inputting the following data points into a computer: one or more morphological characteristics from individual oral cells from a patient, said morphological characteristics selected from cell area, nuclear area, cell circularity, cell aspect ratio, and cell roundness; one or more of gender, age, alcohol intake, and smoking status of said patient. In one embodiment, the method further comprises inputting the following data points into a computer: one or more biomarker levels from individual oral cells from said patient, said biomarker selected from the group consisting of AVB6, EGFR, Ki67, MCM2, beta catenin, EMPPRIN, and CD147, IL-1β, CD44, IGF-1, MMP-2, MMP-9, CD59, Catalase, Profilin, S100A9/MRP14, M2BP, CEA, and Carcinoma associated antigen CA-50.

In certain embodiments, the method comprises detecting the level of at least one, at least two, at least three, at least four, at least five, at least six, at least seven, at least eight, at least nine, at least ten, at least eleven, at least twelve, at least thirteen, at least fourteen, at least fifteen, at least sixteen, at least seventeen, at least eighteen, at least nineteen, or at least twenty of the biomarkers described herein.

In certain embodiments, the method comprises detecting the level of at least one, at least two, at least three, at least four, at least five, at least six, at least seven, at least eight, at least nine, at least ten, at least eleven, at least twelve, at least thirteen, at least fourteen, at least fifteen, at least sixteen, at least seventeen, at least eighteen, at least nineteen, or at least twenty of the biomarkers of: AVB6, EGFR, Ki67, MCM2, beta catenin, EMPPRIN, CD147, CD44, IGF-1, MMP-2, MMP-9, CD59, Catalase, Profilin, S100A9/MRP14, M2BP, CEA, and Carcinoma associated antigen CA-50.

In one embodiment, the method comprises calculating a risk score based on each of the above inputs, wherein said calculation is based on logistic regression or neural network training using data points from patients with known disease status, said risk score providing at least 3 disease classifications. Additional information related to the calculation of a risk score can be found at least in U.S. Patent Application Publication No.: US20140235487, which is incorporated by reference in its entirety.

In one embodiment, the calculation results in 4-way, 5-way or 6-way ordinal scales of disease progression. In certain embodiments, the calculation allows a user to distinguish the following: 1) normal, 2) benign lesions, 3) mild dysplasia, 4) moderate dysplasia, 5) severe dysplasia, 6) carcinoma in situ; and 7) malignant lesion. In one embodiment, the method allows a user to distinguish between benign conditions, mild dysplastic conditions, moderate dysplastic conditions, severe dysplastic conditions and cancerous conditions or allows a user to distinguish the following: 1) benign conditions, 2) dysplastic conditions, 3) moderate disease, 4) high risk disease.

In certain embodiments, the calculation is based on artificial neural nets, logistic regression, linear discriminate analysis, or random forests or based on feed forward artificial neural nets. In some methods, the calculation is based on prior artificial neural network model training using data points from patients with known disease states, or is based on continued neural network model training using data points from patients with known disease states and outcomes. In certain embodiments, each inputted data point corresponds to a node, and each node is linked to serve as an input in a neural network in creating a single output risk score on a continuous scale between 1 and 10. In certain embodiments, the calculation is based on inputting nodes into an input layer, said nodes obtained through logistic regression of all possible classifications of patient samples having known disease states according to at least 3-way classifications; optimizing the artificial neural network as to the number of hidden layers and computing nodes, and outputting a normalized score between 1 and 10, 1 corresponding to benign and 10 corresponding to malignant.

In one embodiment, the calculation is made using the following: Oral Cancer Risk Score=$a_0 + a_1 \times P_1 + a_2 \times P_2 + \ldots$ an $X$ $P_n$, where each of $P_1, P_2, \ldots P_n$ is a node of a logistic regression model, where n is the number of nodes and where $a_0$-$a_n$ is a weight factor determined by training with input data from patients having known disease status.

Typically, in "classification" models, a single measure is collected per biomarker in each sample (e.g. panel of molecular biomarkers concentrations, or morphologic biomarker measures). In some embodiments, the biomarkers are measured for each cell, resulting in hundreds to thousands of measurements per biomarker per sample. Thus, each biomarker has an entire distribution of measurements per sample. In some embodiments, these distributions of biomarker values are further complicated by the fact that the cells within a sample may be heterogeneous, with some cells being benign and other cells being dysplastic or malignant. A homogeneous sample of cells would likely have a bell-shaped distribution on either the arithmetic or logarithmic scales. However, a sample with a heterogeneous mixture of cell types would likely (if the biomarker had good discriminatory properties) be skewed or bi-modal in distribution. Further, the heterogeneous mixture of cell types may increase the biomarker's variance, standard deviation, coefficient of variability (cv), interquartile range, flatness (kurtosis), and skewness. Thus, in certain instances when analyzing biomarker concentration over all cells within a sample, it is useful to try multiple measures of the biomarker distribution in fitting the statistical models. For example, biomarker parameters can be was summarized using the following distributional measures: Mean, Median, Variance, Standard deviation, Coefficient of variation (cv), Skewness, Kurtosis (any measure of the "peakedness" of the probability distribution), 10th Percentile, 25th Percentile, 75th Percentile, 90th Percentile, >0.5 Z-Score (percent of cells with biomarker values greater than 0.5 standard deviations away from healthy cells), >2.0 Z-Score (percent of cells with biomarker values greater than 2.0 standard deviations away from healthy cells), or >3.0 Z-Score (percent of cells with biomarker values greater than 3.0 standard deviations away from healthy cells). Biomarker measurements include, but are not limited to intensity, or biomarker index (% of positive cells per patient/assay based on comparison of each cell's intensity to the intensity of the Control population for that particular biomarker), as well as morphological measurements, including but not limited to nuclear area, cell area, nuclear to cytoplasm ratio distribution, indices, or mean. Some or all of these are combined to establish the largest area under the curve (AUC), or ability to discriminate between two classes, one defined as the cases, the other as the non-cases.

The term "neural network" is traditionally used to refer to a network or circuit of biological neurons, however, modern usage of the term often refers to artificial neural networks, which are composed of artificial neurons or nodes. Thus, the term as used herein refers to artificial neural networks for solving artificial intelligence problems.

An artificial neural network (ANN), often just called a neural network (NN), consists of an interconnected group of artificial neurons, and processes information using a connectionist approach to computation. In most cases a neural network is an adaptive system changing its structure during a learning phase. Neural networks are used for modeling complex relationships between inputs and outputs or to find patterns in data. Neural Networks have several unique advantages as tools for cancer prediction. A very important feature of these networks is their adaptive nature, where "learning by example" replaces conventional "programming by different cases" in solving problems.

There are three major learning paradigms, each corresponding to a particular abstract learning task. These are supervised learning, unsupervised learning and reinforcement learning.

Most of the algorithms used in training artificial neural networks employ some form of gradient descent. This is done by taking the derivative of the cost function with respect to the network parameters and then changing those parameters in a gradient-related direction. Evolutionary methods, gene expression programming, simulated annealing, expectation-maximization, non-parametric methods and particle swarm optimization are some commonly used methods for training neural networks.

This disclosed method can be used by health care providers to determine the risk of oral cancer and the/or the need for additional testing. In one example, a score higher than 5 means a patient needs to be referred to scalpel biopsy. A score between 3 and 5 may mean a patient needs to be seen in one month for a repeat brush biopsy. A clear quantitative score such as one produced here will empower clinicians to make these decisions with more assurance.

In certain embodiments, the method comprises treating a subject with an oral cancer treatment regimen based upon the assessment using the system and method described herein. For example, in certain embodiments, a subject is treated with chemotherapy, radiation, hormone therapy, surgery, targeted therapy (e.g. small molecules and therapeutic antibodies) or the like based at least in part upon an assessment produced by a system or method of the present invention.

In certain embodiments, the method comprises performing a subsequent analysis on a subsequent sample obtained from the subject after a treatment regimen is administered, in order to assess the efficacy of the administered treatment regimen.

In one embodiment, a method of training a neural network includes obtaining images of a plurality of tissue samples from a plurality of subjects, analyzing the plurality of tissue samples to calculate or obtain one or more morphological characteristics as disclosed herein, obtaining measures or calculating a plurality of biomarkers corresponding to the plurality of subjects as disclosed herein, obtaining a set of binary or non-binary output classification values for the plurality of subjects as described herein, and training a neural network to assign weight factors to the plurality of input parameters (comprising the images of the tissue samples, the morphological characteristics, and the biomarkers), in order to generate a predictive model for the one or more binary or non-binary output classifiers based on the input parameters. In some embodiments, the predictive model is configured to generate one or more risk factors based on the binary or non-binary output classification values. In some embodiments, the method further comprises obtaining a set of demographic data or other characteristics from the plurality of subjects and training the machine learning algorithm to optimize one or more weight factors of the biomarkers and/or demographic data in order to build the predictive model.

In one embodiment, the invention provides a kit for diagnosing or assessing oral cancer. In one embodiment, the kit comprises a cartridge of the invention. In one embodiment, the cartridge is wrapped in an airtight package. In one embodiment, the kit further comprises a vial of assay fluid. The kit can include other components, e.g., instructions for use.

In some aspects of the present invention, software executing the instructions provided herein may be stored on a non-transitory computer-readable medium, wherein the software performs some or all of the steps of the present invention when executed on a processor.

Aspects of the invention relate to algorithms executed in computer software. Though certain embodiments may be described as written in particular programming languages, or executed on particular operating systems or computing platforms, it is understood that the system and method of the present invention is not limited to any particular computing language, platform, or combination thereof. Software executing the algorithms described herein may be written in any programming language known in the art, compiled or interpreted, including but not limited to C, C++, C#, Objective-C, Java, JavaScript, Python, PHP, Perl, Ruby, or Visual Basic. It is further understood that elements of the present invention may be executed on any acceptable computing platform, including but not limited to a server, a cloud instance, a workstation, a thin client, a mobile device, an embedded microcontroller, a television, or any other suitable computing device known in the art.

Parts of this invention are described as software running on a computing device. Though software described herein may be disclosed as operating on one particular computing device (e.g. a dedicated server or a workstation), it is understood in the art that software is intrinsically portable and that most software running on a dedicated server may also be run, for the purposes of the present invention, on any of a wide range of devices including desktop or mobile devices, laptops, tablets, smartphones, watches, wearable electronics or other wireless digital/cellular phones, televisions, cloud instances, embedded microcontrollers, thin client devices, or any other suitable computing device known in the art.

Similarly, parts of this invention are described as communicating over a variety of wireless or wired computer networks. For the purposes of this invention, the words "network", "networked", and "networking" are understood to encompass wired Ethernet, fiber optic connections, wireless connections including any of the various 802.11 standards, cellular WAN infrastructures such as 3G or 4G/LTE networks, Bluetooth®, Bluetooth® Low Energy (BLE) or Zigbee® communication links, or any other method by which one electronic device is capable of communicating with another. In some embodiments, elements of the networked portion of the invention may be implemented over a Virtual Private Network (VPN).

Aspects of the invention relate to a machine learning algorithm, machine learning engine, or neural network. A neural network may be trained based on various attributes of one or more cells, examples of which are disclosed herein, and may output one or more predictive values based on the attributes. The resulting predictive values may then be judged according their success rate in matching one or more binary classifiers or quality metrics for known input values, and the weights of the attributes may be optimized to maximize the average success rate for binary classifiers or quality metrics. In this manner, a neural network can be trained to predict and optimize for any binary classifier or quality metric that can be experimentally measured. Examples of binary classifiers or quality metrics that a neural network can be trained on are discussed herein, including cancer severity, effectiveness of cancer treatment, or cancer diagnosis. In some embodiments, the neural network may have multi-task functionality and allow for simultaneous prediction and optimization of multiple quality metrics.

In embodiments that implement such a neural network, a neural network of the present invention may identify one or more attributes whose predictive value (as evaluated by the neural network) has a high correlative value, thereby indicating a strong correlation with one or more results.

In some embodiments, the neural network may be updated by training the neural network using additional inputs having known outcomes. Updating the neural network in this manner may improve the ability of the neural network in predictive accuracy. In some embodiments, training the neural network may include using a value of a desirable parameter associated with a known outcome. For example, in some embodiments, training the neural network may include predicting a value of an output parameter for a set of cell images, comparing the predicted value to the corresponding value associated with a known output parameter from the subject from which the cell images were drawn, and training the neural network based on a result of the comparison. If the predicted value is the same or substantially similar to the observed value, then the neural network may be minimally updated or not updated at all. If the predicted value differs from that of the known output parameter, then the neural network may be substantially updated to better correct for this discrepancy. Regardless of how the neural network is retrained, the retrained neural network may be used to propose additional attributes and weightings for new or existing attributes.

Although the techniques of the present application are in the context of cancer diagnosis, assessment, and treatment, it should be appreciated that this is a non-limiting application of these techniques as they can be applied to other types of parameters or attributes. Depending on the type of data used to train the neural network, the neural network can be optimized for different types of diagnosis and treatment. Querying the neural network may include inputting an initial data set and set of one or more attributes disclosed herein. The neural network may have been previously trained using different data set. The query to the neural network may be for one or more predictive output values. A binary or non-binary output value may be received from the neural network in response to the query.

The techniques described herein associated with iteratively querying a neural network by inputting a training data set, receiving an output from the neural network that has one or more output values, and successively providing further data sets as an input to the neural network, can be applied to other machine learning applications.

In some embodiments, an iterative process is formed by querying the neural network for one or more output parameters based on an input data set, receiving the one or more output parameters, and identifying one or more changes to be made to the input data set based on the output received. An additional iteration of the iterative process may include inputting the data set from an immediately prior iteration with one or more changes. The iterative process may stop when one or more output values substantially match the output values from a training iteration.

Additional information regarding certain aspects of the system, method, or device described herein, can be found in U.S. Pat. No. 8,257,967, WO03090605, US20060073585, US2006079000, US2006234209, WO2004009840, WO2004072097, U.S. Pat. Nos. 7,781,226, 8,101,431, 8,105,849, US2006257854, US20060257941, US2006257991, WO2005083423, WO2005085796, WO2005085854, WO2005085855, WO2005090983, U.S. Pat. No. 8,377,398, WO2007053186, US2010291431, WO2007002480, US2008050830, WO2007134191, US2008038738, WO2007134189, US2008176253, US2008300798, WO2008131039, US2012208715, WO2011022628, US2013130933, WO2012021714, US2013295580, WO2012065117, US2013274136, WO2012065025, WO2012154306, US2012322682, US20130295580, US20140235487, US20140094391, and US20150111778, each of which is incorporated by reference in its entirety.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the present invention and practice the claimed methods. The following working examples therefore are not to be construed as limiting in any way the remainder of the disclosure.

Example 1

Experiments were conducted to identify cellular phenotypes within a cytological sample of oral cells obtained using a rotating brush (i.e. a brush biopsy) on oral tissue. The samples were processed, where cells were collected on a membrane within a self-contained disposable cartridge and stained using various dyes or antibodies (e.g., DAPI (nuclear stain), phalloidin (cytoplasmic stain), and anti-Ki67 (biomarker)).

Figure 3:
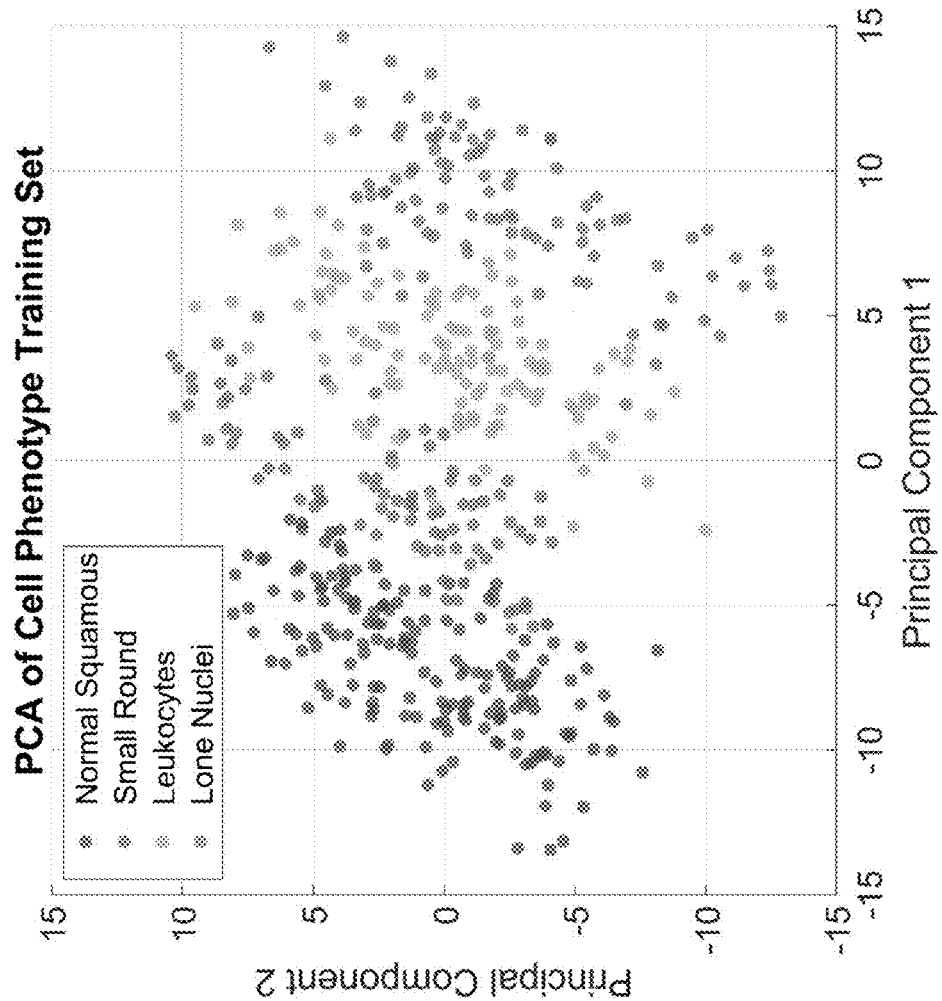
FIG. 3 depicts the results of experiments where principle component analysis (PCA) is used to discriminate between four different cellular types from the analyzed samples: normal squamous cells, small round cells, leukocytes, and lone nuclei.
Figure 3:
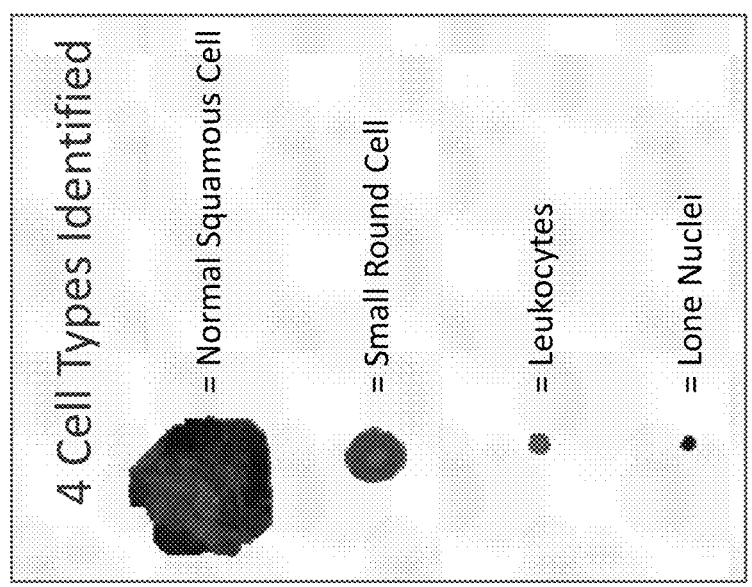
Figure 4:
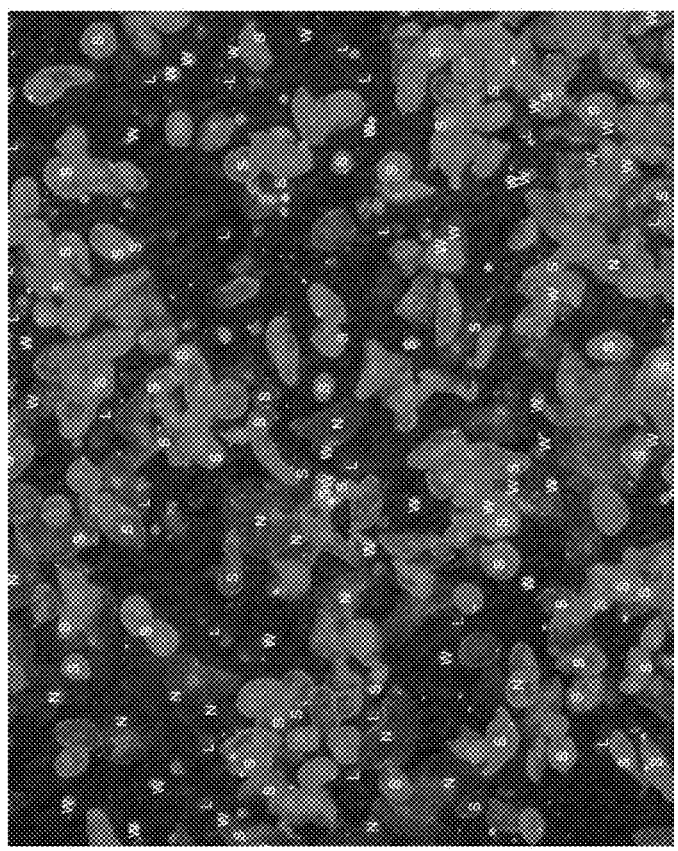
FIG. 4 depicts images comparing the phenotypes within a benign lesion (left) and an oral squamous cell carcinoma (OSCC) lesion (right).
Figure 4:
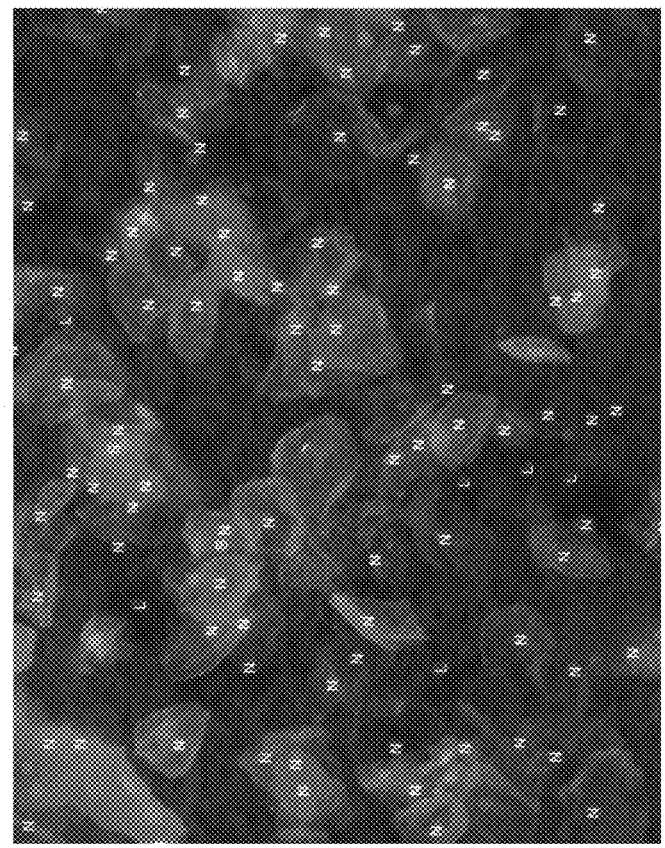
Figure 7:
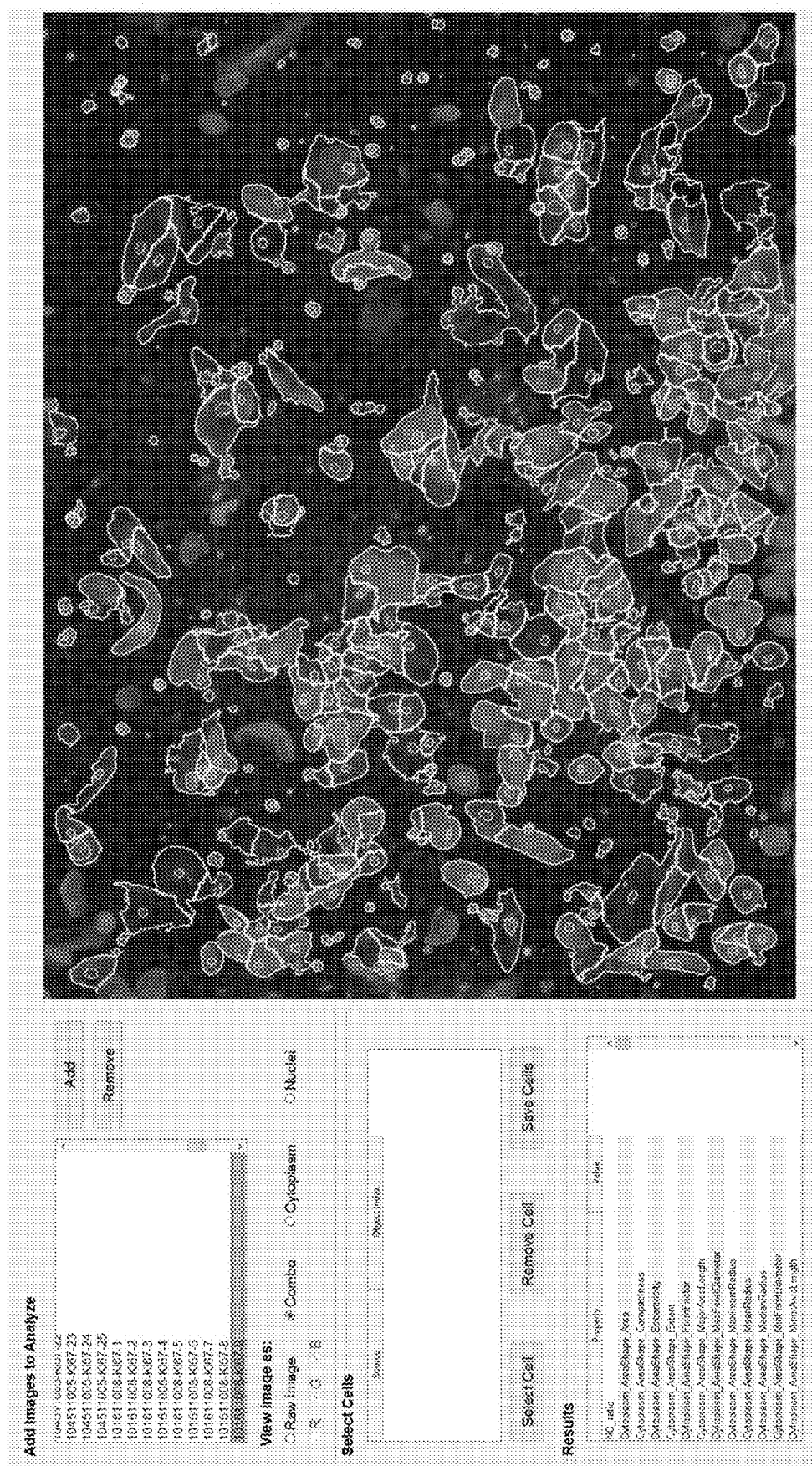
FIG. 7 depicts an image demonstrating cell outlines and measurement data.
Figure 8:
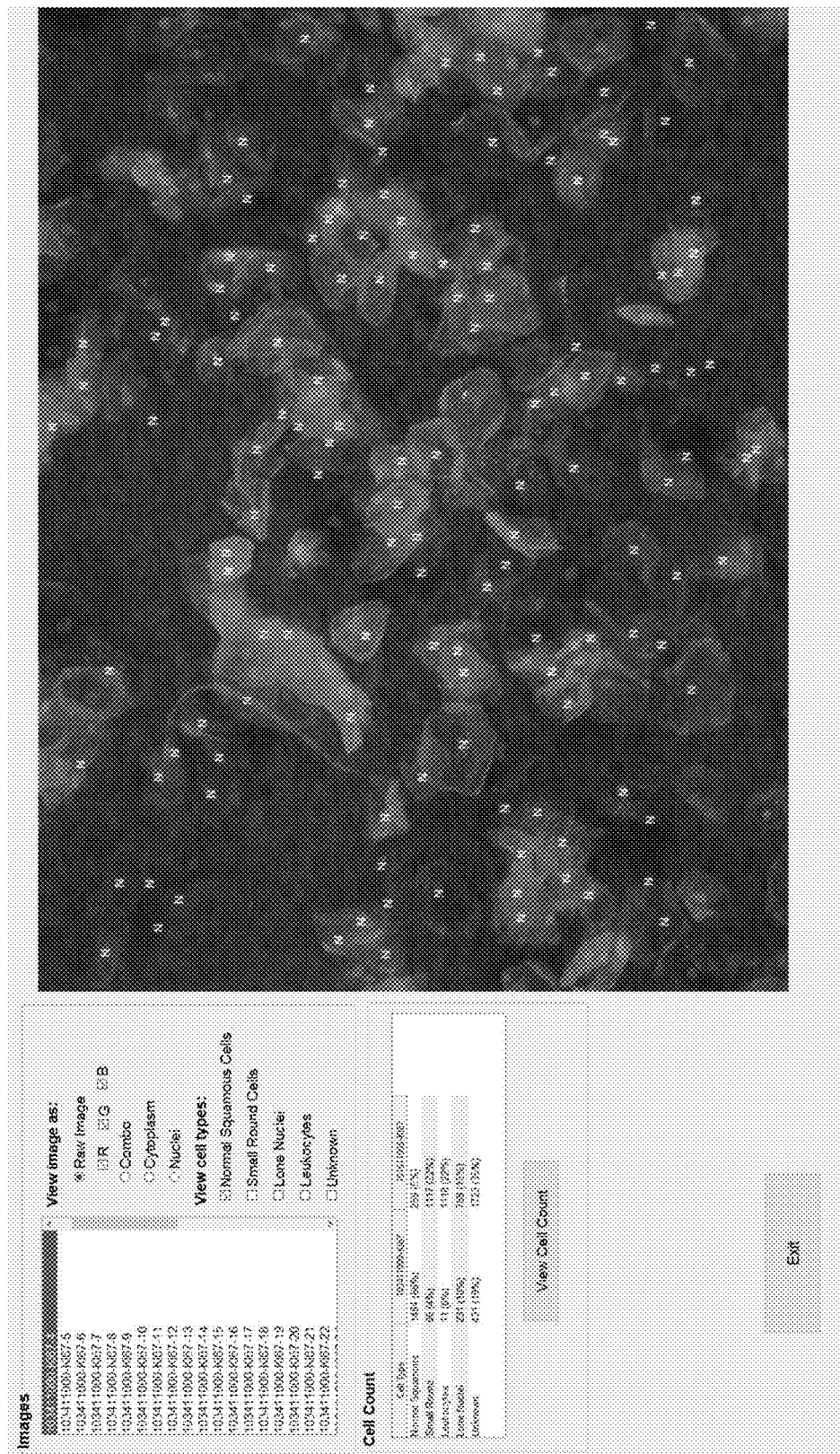
FIG. 8 depicts an image of normal squamous cells in a benign lesion sample.
Figure 9:
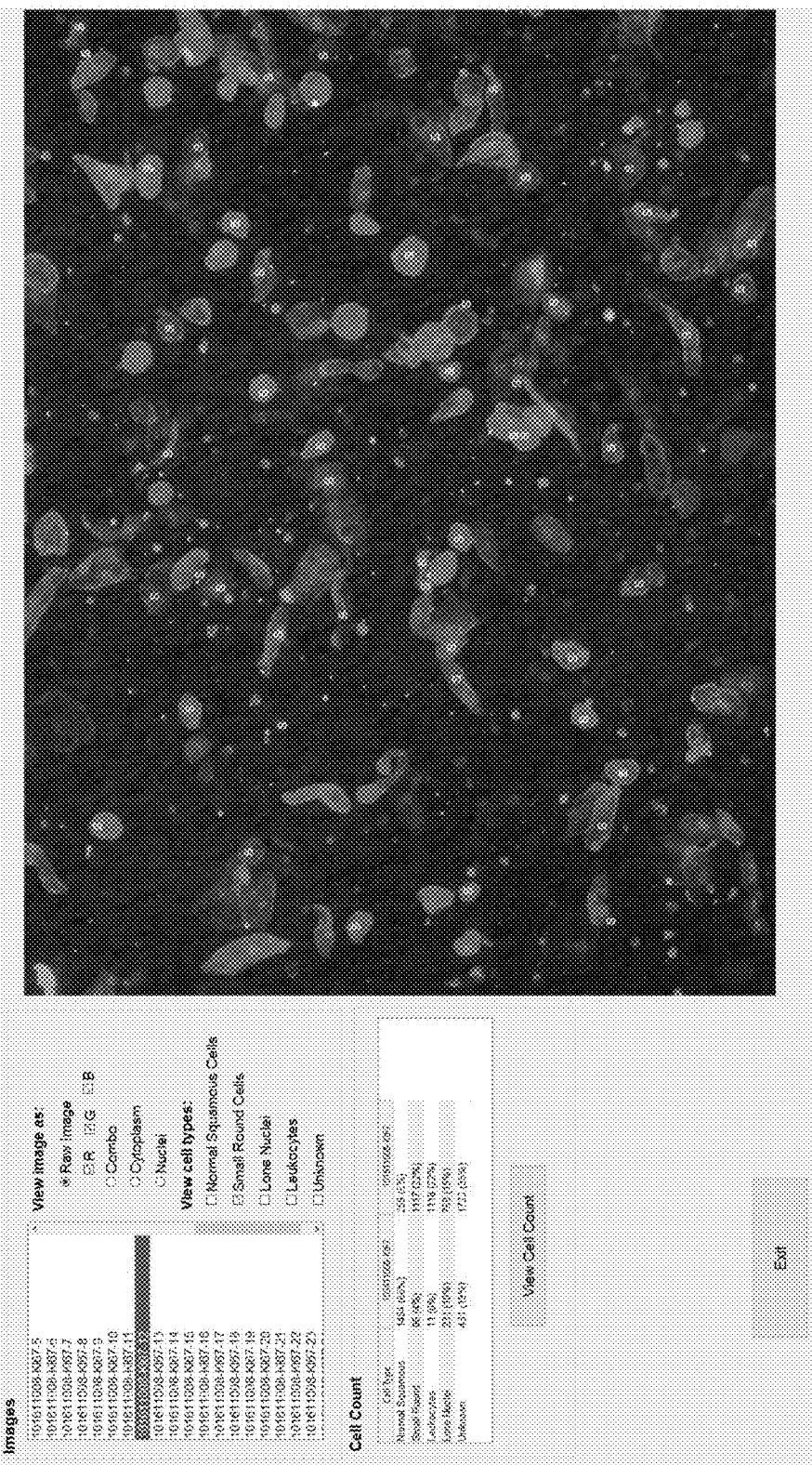
FIG. 9 depicts an image of small round cells in an OSCC lesion sample.

As demonstrated in FIG. 3, principle component analysis (PCA) is used to discriminate between four different cellular phenotypes in the analyzed samples: normal squamous cells, small round cells, leukocytes, and lone nuclei. FIG. 4 depicts images comparing the phenotypes within a benign lesion (left) and an oral squamous cell carcinoma (OSCC) lesion (right). Software depicting the outlining of stained cells is shown in FIG. 7. Normal squamous cells in a benign lesion sample are shown in FIG. 8 and small round cells in an OSCC lesion sample are shown in FIG. 9.

Figure 10:
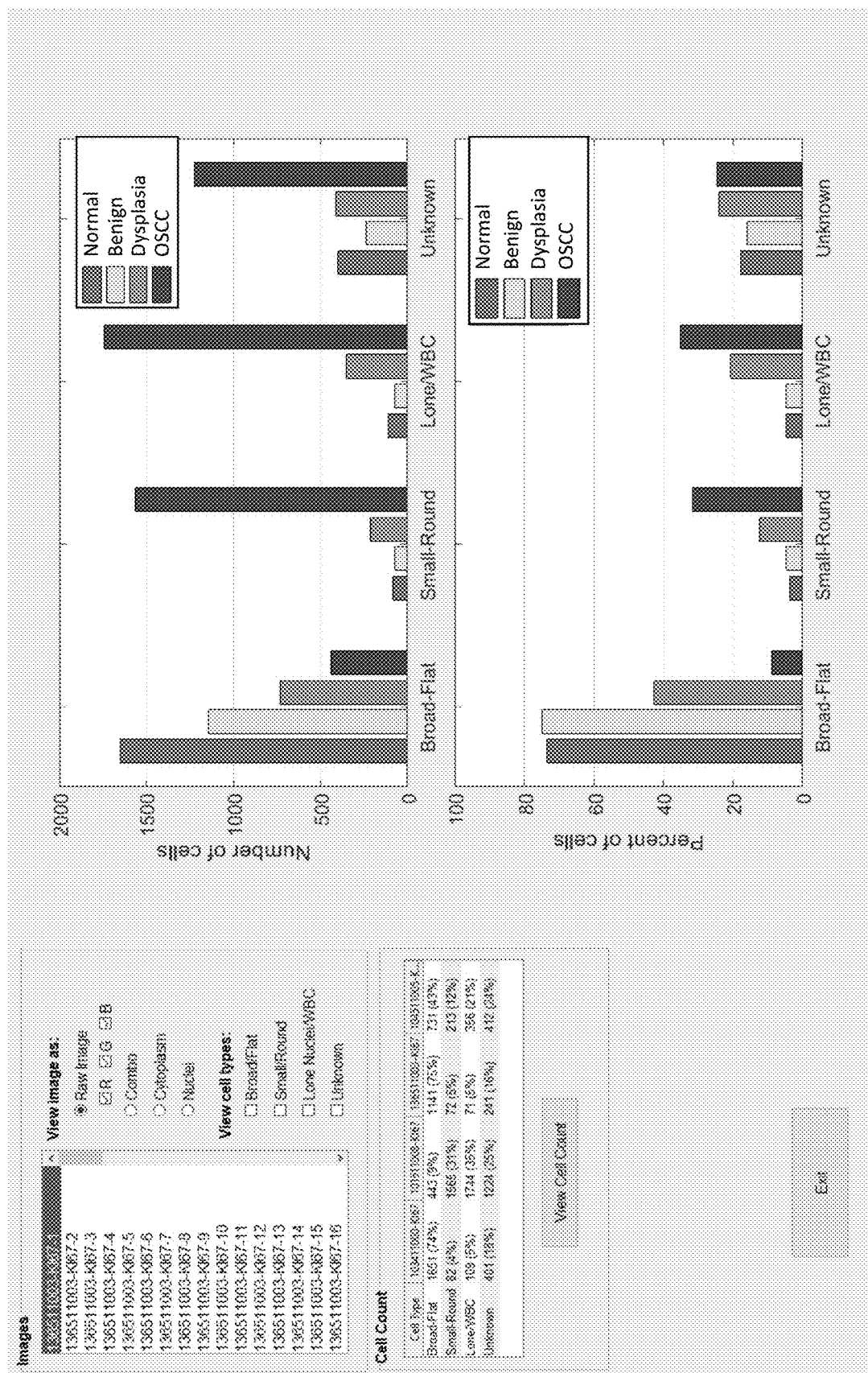
FIG. 10 depicts the results of example experiments where broad-flat phenotype decreases in dysplasia and OSCC compared to normal and benign samples, while small round and WBC/lone phenotypes increase in dysplasia and OSCC compared to normal and benign.

The counting of cells of particular cell phenotypes is shown in FIG. 10, where broad-flat phenotype (i.e. normal squamous cell phenotype) decreases in dysplasia and OSCC compared to normal and benign samples, while small round and WBC/lone phenotypes increase in dysplasia and OSCC compared to normal and benign.

Figure 11:
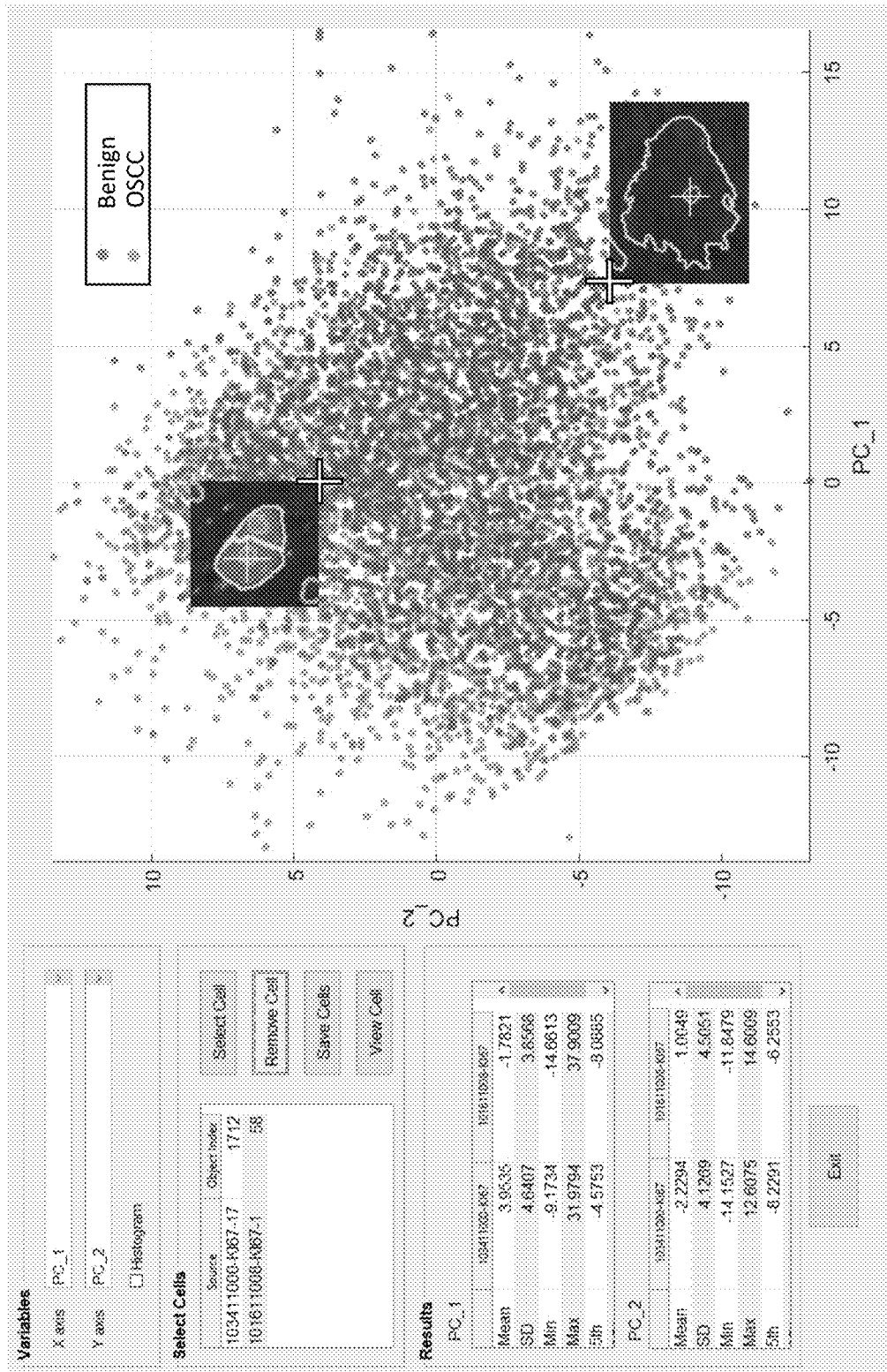
FIG. 11 depicts a principal component analysis where over 150 cytology parameters are used in a 2D scatter plot, demonstrating the ability to discriminate between cells in a benign and OSCC samples.

FIG. 11 depicts a principal component analysis where over 150 cytology parameters are used in a 2D scatter plot, demonstrating the ability to discriminate between cells in a benign and OSCC sample.

Figure 12:
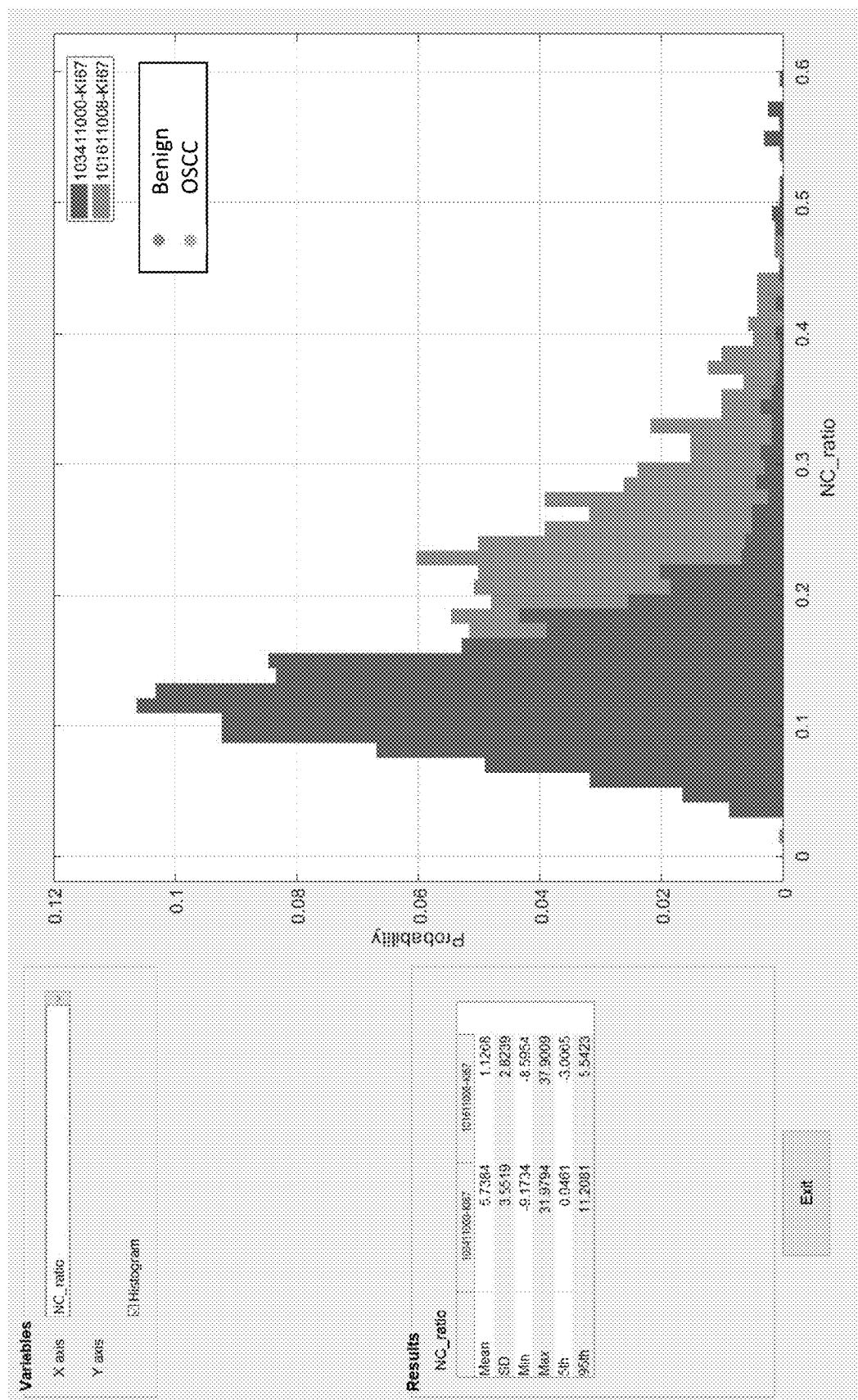
FIG. 12 shows a histogram of N/C ratio in benign and OSCC samples that can be used to compare patient samples.

FIG. 12 shows a histogram of N/C ratio in benign and OSCC samples that can be used to compare patient samples.

Figure 13:
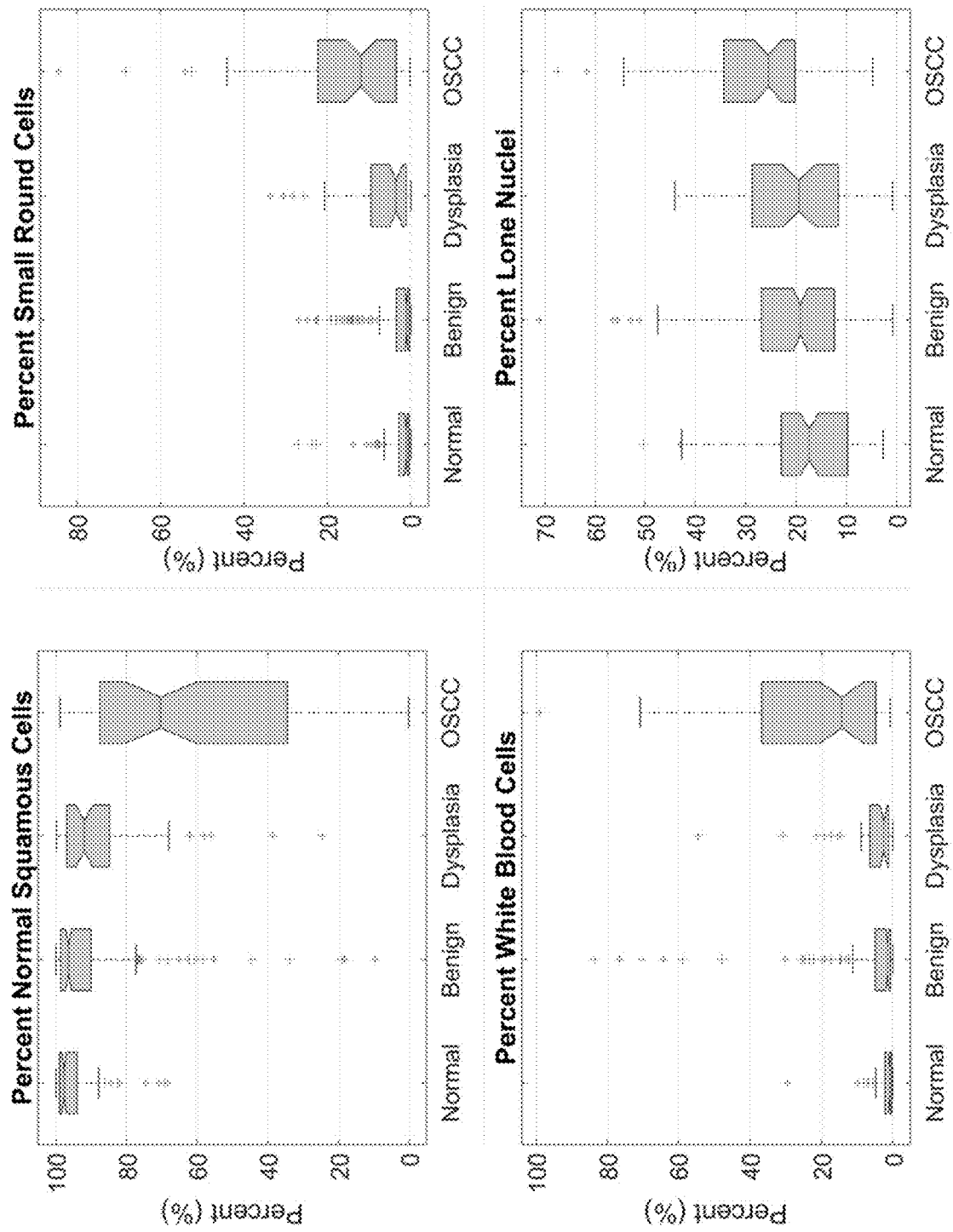
FIG. 13 depicts the results of analysis demonstrating that the percentage of normal squamous cells decreases during disease progression, while the percentages of small round cells, white blood cells, and lone nuclei increase during disease progression.

FIG. 13 depicts the results of analysis demonstrating that the percentage of normal squamous cells decreases during disease progression, while the percentage of small round cells, white blood cells, and lone nuclei increase during disease progression.

Figure 5:
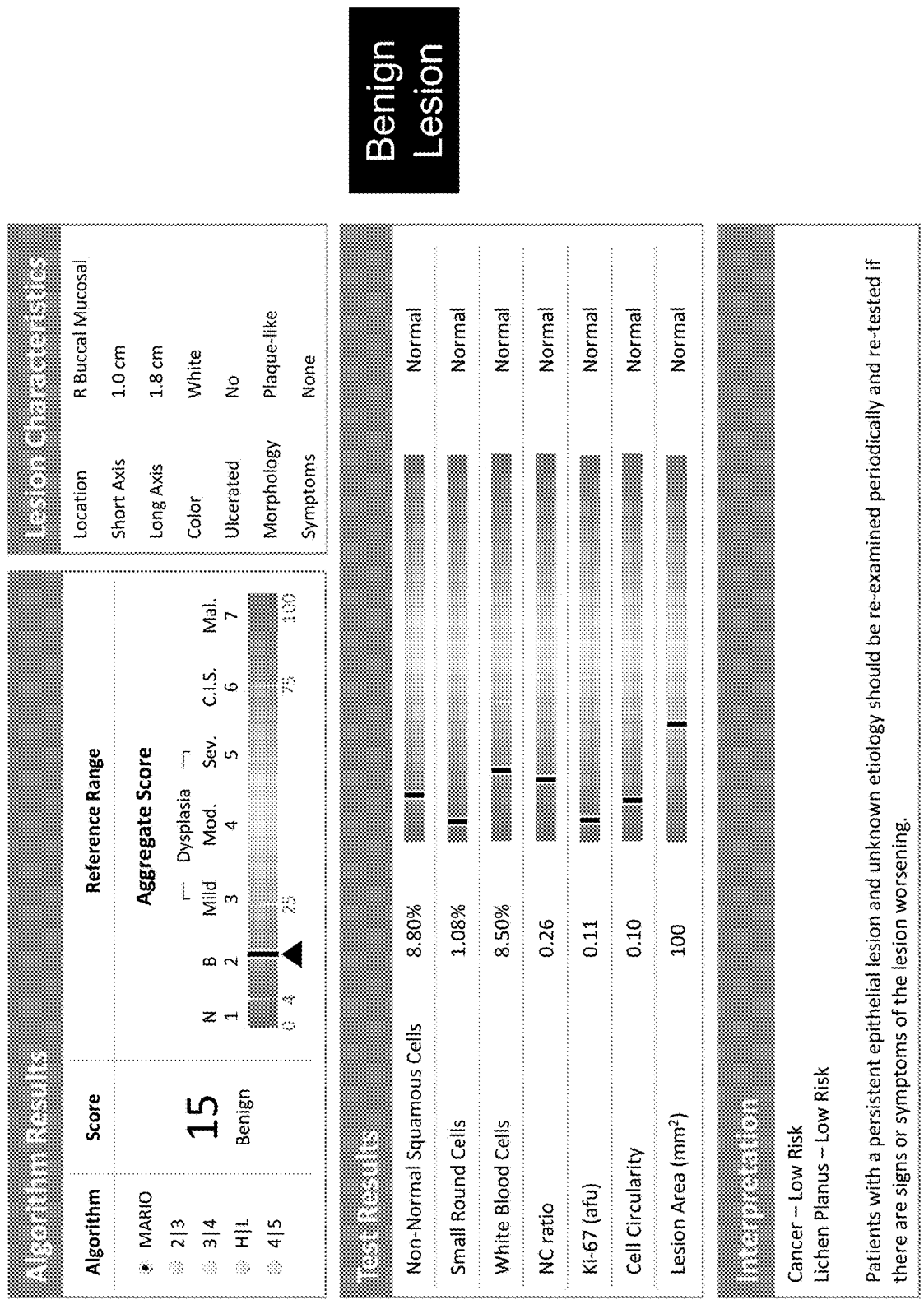
FIG. 5 depicts an exemplary output, analysis, and scoring as conducted by a system and method described herein, where non-normal squamous cells, small round cells, white blood cells, N/C ratio, Ki-67 expression, cell circularity, and lesion area are used. In the sample whose analysis is shown in FIG. 5, the cellular phenotype data are all within the normal range, and the sample is classified as a benign lesion.

FIG. 5 depicts an exemplary output, analysis, and scoring as conducted by the system and method described herein, where non-normal squamous cells, small round cells, white blood cells, N/C ratio, Ki-67 expression, cell circularity, and lesion area are used. In the sample whose analysis is shown in FIG. 5, the cellular phenotype data are all within the normal range, and the sample is classified as a benign lesion.

Figure 6:
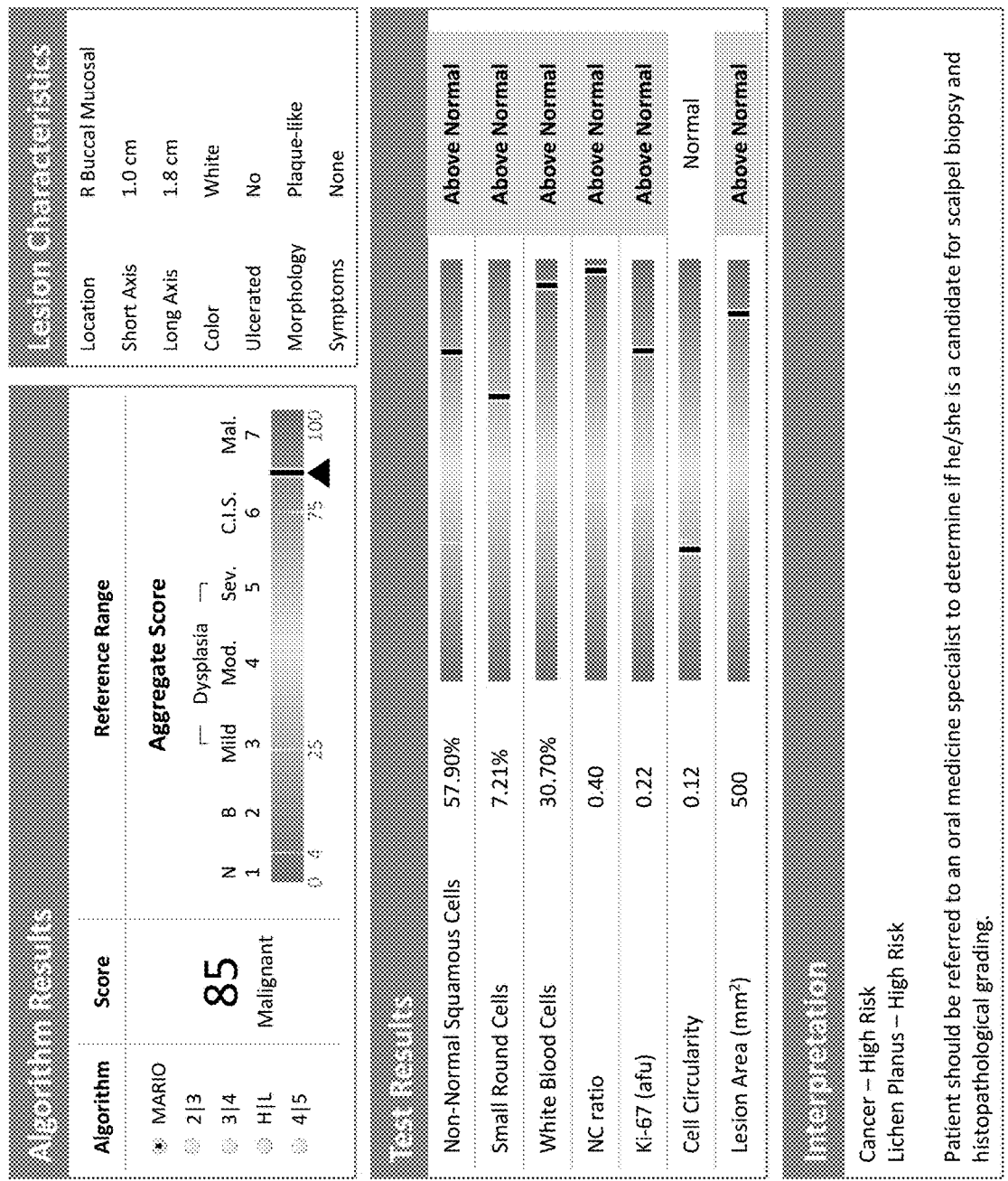
FIG. 6 depicts an exemplary output, analysis, and scoring as conducted by the system and method described herein, where non-normal squamous cells, small round cells, white blood cells, N/C ratio, Ki-67 expression, cell circularity, and lesion area are used. In the sample whose analysis is shown in FIG. 6, the cellular phenotype data are all above normal, and the sample is classified as a malignant lesion.

FIG. 6 depicts an exemplary output, analysis, and scoring as conducted by the system and method described herein, where non-normal squamous cells, small round cells, white blood cells, N/C ratio, Ki-67 expression, cell circularity, and lesion area are used. In the sample whose analysis is shown in FIG. 6, the cellular phenotype data are all above normal, and the sample is classified as a malignant lesion.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A method of treating oral cancer in a subject comprising:
    identifying a cellular phenotype of one or more cells in a sample of the subject;
    determining four or more cellular phenotype characteristics of the sample based upon the identified cellular phenotype of the one or more cells, wherein the four or more cellular phenotype characteristics comprise percent of normal squamous cells, percent of small round cells, percent of white blood cells, and percent of lone nuclei;
    using the four or more cellular phenotype characteristics to assess the presence or severity of oral cancer in the subject; and
    treating the subject with an oral cancer treatment regimen selected from the group consisting of: chemotherapy, radiation, hormone therapy, surgery, and targeted therapy.

2. The method of claim 1, wherein the four or more cellular phenotype characteristics further comprise percent of non-normal squamous cells.

3. The method of claim 1 further comprising
    determining one or more morphological characteristics from individual cells of the sample, said morphological characteristics selected from nuclear area, cell area, cell circularity, cell aspect ratio, and cell roundness;
    transmitting the one or more morphological characteristics to a computer; and
    using the cellular phenotype characteristics and morphological characteristics to assess the severity of oral cancer in the subject.

4. The method of claim 1 further comprising:
    determining one or more biomarker levels in cells of the sample, said biomarker selected from the group consisting of alpha V beta 6 (AVB6), Epidermal Growth Factor Receptor (EGFR), Ki67, Geminin, Mini Chromosome Maintenance protein (MCM2), beta catenin, EMPPRIN, and CD147;
    transmitting the one or more biomarker levels to a computer; and
    using the cellular phenotype characteristics and biomarker levels to assess the severity of oral cancer in the subject.

5. The method of claim 4 further comprising:
    transmitting one or more demographic data of the subject to a computer, said demographic data selected from the group consisting of gender, age, alcohol intake, and smoking status of the subject; and
    using the cellular phenotype characteristics and biomarker levels to assess the severity of oral cancer in the subject.

6. The method of claim 1, wherein the method allows for the distinguishing between at least: 1) normal, 2) benign lesions, 3) mild dysplasia, 4) moderate dysplasia, 5) severe dysplasia, 6) carcinoma in situ; and 7) malignant lesion.

7. The method of claim 1 comprising calculating a risk score based upon the cellular phenotype characteristics.

8. The method of claim 7, further comprising displaying the risk score on an output device.

9. The method of claim 7, wherein said calculation based on artificial neural nets, logistic regression, linear discriminate analysis, or random forests.

10. The method of claim 1 further comprising transmitting the one or more cellular phenotype characteristics to a remote processor to be assessed by a pathologist.

* * * * *